US011106616B1

(12) United States Patent
Wu

(10) Patent No.: US 11,106,616 B1
(45) Date of Patent: Aug. 31, 2021

(54) VIRTUALIZED PERIPHERAL COMPONENT INTERCONNECT EXPRESS (PCIE) DEVICE

(71) Applicant: XILINX, INC., San Jose, CA (US)

(72) Inventor: Chunhua Wu, Shanghai (CN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/690,212

(22) Filed: Nov. 21, 2019

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/4221; G06F 2213/0026
See application file for complete search history.

(56) References Cited

U.S. PATENT DOCUMENTS

| | | | |
|---|---|---|---|
| 7,356,636 B2 | 4/2008 | Torudbakken et al. | |
| 7,535,254 B1* | 5/2009 | Case | H03K 19/17732 326/39 |
| 7,743,197 B2 | 6/2010 | Chavan et al. | |
| 7,752,360 B2 | 7/2010 | Galles | |
| 7,904,629 B2 | 3/2011 | Daniel | |
| 8,762,698 B2 | 6/2014 | Khosravi et al. | |
| 2006/0206655 A1* | 9/2006 | Chappell | G06F 13/4027 710/315 |
| 2009/0094399 A1* | 4/2009 | Daniel | G06F 13/4022 710/311 |
| 2009/0292854 A1* | 11/2009 | Khoo | G06F 13/4027 710/312 |
| 2010/0146170 A1* | 6/2010 | Brown | G06F 13/4022 710/105 |
| 2010/0161870 A1* | 6/2010 | Daniel | G06F 13/385 710/314 |
| 2010/0217911 A1* | 8/2010 | Sisto | G06F 13/4295 710/303 |

(Continued)

OTHER PUBLICATIONS

Application Note: Virtex-7 Family—Designing with SR-IOV Capability of Xilinx Virtex-7 PCI Express Gen3 Integrated Block, dated Nov. 15, 2013, consists of 26 pages.

(Continued)

*Primary Examiner* — Idriss N Alrobaye
*Assistant Examiner* — Henry W Yu
(74) *Attorney, Agent, or Firm* — Patterson + Sheridan, LLP

(57) ABSTRACT

Examples described herein generally relate to a Peripheral Connect Interconnect Express (PCIe) device. An example is a non-transitory memory storing a representation of a design that is to be implemented on a programmable integrated circuit. The design includes a classifier module (CM), a message trap engine module (MTEM), and a configuration space. The CM is capable of receiving a PCIe message and is configured to determine whether the PCIe message is a PCIe Type 1 configuration transaction. The CM is configured to forward the PCIe message to an endpoint device and to the MTEM when the PCIe message is a non-PCIe Type 1 configuration transaction and the PCIe Type 1 configuration transaction, respectively. The MTEM is configured to virtualize a downstream port(s) of a virtual switch and maintain the configuration space. The MTEM is capable of accessing the configuration space in response to the PCIe message.

20 Claims, 8 Drawing Sheets

(56) References Cited

U.S. PATENT DOCUMENTS

| | | | | |
|---|---|---|---|---|
| 2010/0329254 A1* | 12/2010 | Chen | ............... | H04L 12/18 |
| | | | | 370/390 |
| 2011/0145655 A1* | 6/2011 | Erickson | ............ | G06F 11/349 |
| | | | | 714/43 |
| 2011/0283025 A1* | 11/2011 | Maxwell | ............ | G06F 3/0607 |
| | | | | 710/16 |
| 2013/0332634 A1* | 12/2013 | Glaser | ............ | G06F 13/4286 |
| | | | | 710/104 |
| 2014/0181354 A1* | 6/2014 | Yi | ............ | G06F 13/4022 |
| | | | | 710/313 |
| 2015/0026385 A1* | 1/2015 | Egi | ............ | G06F 13/161 |
| | | | | 710/314 |
| 2015/0254202 A1* | 9/2015 | Mcglone | ............ | G06F 13/4022 |
| | | | | 710/316 |
| 2016/0117279 A1* | 4/2016 | Borikar | ............ | G06F 13/4081 |
| | | | | 710/316 |
| 2018/0276161 A1 | 9/2018 | Ahn | | |

OTHER PUBLICATIONS

Xilinx All Programable—DMA/Bridge Subsystem for PCI Express v4.0 Product Guide, Video Design Suite, dated Dec. 20, 2017, consists of 140 pages.

\* cited by examiner

US 11,106,616 B1

VIRTUALIZED PERIPHERAL COMPONENT INTERCONNECT EXPRESS (PCIE) DEVICE

TECHNICAL FIELD

Examples of the present disclosure generally relate to a Peripheral Component Interconnect Express (PCIe) device and methods of operating such device, and in particular, relate to a virtualized PCIe device and methods for operating such device.

BACKGROUND

The Peripheral Component Interconnect-Special Interest Group (PCI-SIG) developed a serial bus protocol, Peripheral Component Interconnect (PCI), for higher throughput, and that protocol was later enhanced to PCI Extended (PCI-X) and to PCI Express (PCIe). PCIe is a point-to-point full duplex serial bus standard. PCIe was designed to replace previous standards for a faster and flexible solution. PCIe protocol has evolved over a period of time through generations, accommodating the needs of higher speeds and throughput. Originally intended for desktop computers, PCIe is now a popular choice in applications like servers, network attached storage, network switches/routers, set top boxes and other embedded applications for scalable bandwidth and flexibility.

SUMMARY

Some examples described herein relate to a Peripheral Connect Interconnect Express (PCIe) device. The PCIe device can be virtualized and customizable. In some examples, the PCIe device includes a virtual switch and one or more endpoint devices. The PCIe device can be implemented on a programmable integrated circuit (IC), such as a field programmable gate array (FPGA), which may further be a system-on-chip (SoC). In some examples, a configuration space of the one or more endpoint devices can be customized, including the capabilities of the one or more endpoint devices.

An example is a non-transitory memory storing a representation of a design. The design is to be implemented on a programmable integrated circuit. The design includes a classifier module, a message trap engine module, and a configuration space. The classifier module is capable of receiving a Peripheral Component Interconnect Express (PCIe) message and is configured to determine whether the PCIe message is a PCIe Type 1 configuration transaction or is a non-PCIe Type 1 configuration transaction. The classifier module is further configured to forward the PCIe message to an endpoint device when the PCIe message is the non-PCIe Type 1 configuration transaction. The classifier module is further configured to forward the PCIe message to the message trap engine module when the PCIe message is the PCIe Type 1 configuration transaction. The message trap engine module is configured to virtualize one or more downstream ports of a virtual switch. The configuration space is maintained by the message trap engine module. The message trap engine module is capable of accessing the configuration space in response to the PCIe message.

Another example is a method for operating a programmable integrated circuit. By a classifier module on the programmable integrated circuit, whether a received Peripheral Component Interconnect Express (PCIe) message is a PCIe Type 1 configuration transaction or a non-PCIe Type 1 configuration transaction is determined. The received PCIe message is forwarded from the classifier module to one or more endpoint devices on one or more programmable logic regions of the programmable integrated circuit when the received PCIe message is the non-PCIe Type 1 configuration transaction. The received PCIe message is forwarded from the classifier module to a message trap engine module when the received PCIe message is the PCIe Type 1 configuration transaction. The message trap engine module virtualizes one or more downstream ports of a virtual switch. By the message trap engine module, a configuration space of the one or more downstream ports or the one or more endpoint devices is accessed when the received PCIe message targets the one or more downstream ports or the one or more endpoint devices, respectively.

Another example is a device including a programmable integrated circuit. The programmable integrated circuit includes a classifier module, a message trap engine module, and a configuration space. The classifier module is capable of receiving a Peripheral Component Interconnect Express (PCIe) message and is configured to determine whether the PCIe message is a PCIe Type 1 configuration transaction or is a non-PCIe Type 1 configuration transaction. The classifier module is further configured to forward the PCIe message to an endpoint device in one or more programmable logic regions of the programmable integrated circuit when the PCIe message is the non-PCIe Type 1 configuration transaction. The classifier module is further configured to forward the PCIe message to the message trap engine module when the PCIe message is the PCIe Type 1 configuration transaction. The message trap engine module is configured to virtualize one or more downstream ports of a virtual switch. The configuration space of the one or more downstream ports and the endpoint device is maintained by the message trap engine module. The message trap engine module is capable of accessing the configuration space in response to the PCIe message.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
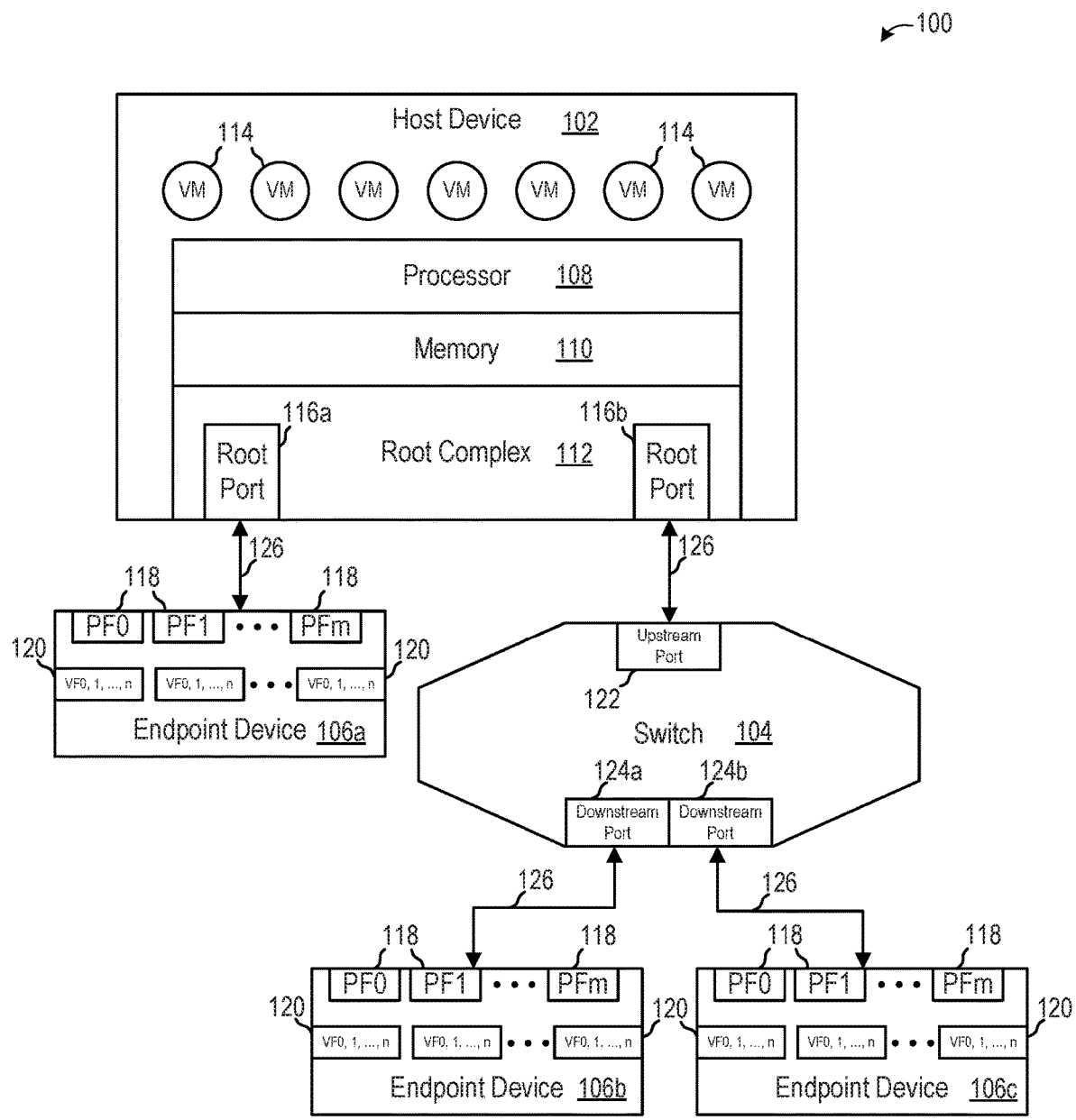
FIG. 1 depicts a Peripheral Component Interconnect Express (PCIe) hierarchy according to some examples.

Some examples described herein relate to a Peripheral Connect Interconnect Express (PCIe) device. The PCIe device can be virtualized and customizable. In some examples, the PCIe device includes a virtual switch and one or more endpoint devices. The PCIe device can be implemented on a programmable integrated circuit (IC), such as a field programmable gate array (FPGA), which may further be a system-on-chip (SoC). A virtual switch can be or include one or multiple layers. The virtual switch can be implemented, as least in part, by a message trap engine module. The message trap engine module can initialize and maintain a configuration space for one or more downstream ports of the virtual switch and for one or more endpoint devices. The message trap engine module can expose the one or more endpoint devices to a host. The virtualized device can be customizable to implement any device type and any number of physical functions (PFs) and/or virtual functions (VFs). The virtual device can be or include a PCIe virtual switch and one or more customizable PCIe endpoint devices that can be implemented in an FPGA.

The message trap engine module can be implemented to trap the PCIe configuration cycles during enumeration of, e.g., the Basic Input Output System (BIOS) and/or operating system. As a result, a virtualized PCIe endpoint device and/or virtual switch can be created. The configuration space of the one or more endpoint devices can be customized. The PCIe capabilities that are desired can be exposed and can implement any kind of device. For example, a VirtIO 1.0 PCI device with modem interface can be implemented and can expose the five PCIe capabilities that VirtIO 1.0 implements in a legacy configuration space. In another example, a Single root input/output virtualization (SR-IOV) capable PCIe device can be implemented to support many PFs and/or VFs. A hierarchy of a virtual switch can also be customizable and can include multiple layers to support any number of virtual PCIe endpoint devices.

Some examples can be implemented in a number of ways. For example, when a design implementing a virtual device is to be implemented on an FPGA, some examples can be implemented by a non-transitory memory storing a representation of the design, and some examples can be implemented by loading and/or operating the design on the FPGA. A representation of the design stored on non-transitory memory can be, e.g., an intellectual property (IP) core, which may be incorporated into a larger design, and/or can be a boot image file to be loaded onto the FPGA. Other ways of implementing examples can be used.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

FIG. 1 illustrates a Peripheral Component Interconnect Express (PCIe) hierarchy 100 according to some examples. PCIe is a standard interface to connect, e.g., network devices, storage devices, and peripheral devices to a processor, such as a central processing unit (CPU). The PCIe hierarchy 100 of FIG. 1 includes a host device 102, a switch 104, and endpoint devices 106*a*, 106*b*, 106*c* (individually or collectively, "endpoint device(s) 106").

The host device 102 includes a processor 108 (e.g., a CPU), memory 110, and a root complex 112. A number of virtual machines (VMs) 114 are operating on the host device 102. The root complex 112, in some examples, is a single root for single root input/output virtualization (SR-IOV). The root complex 112 is an interface between the VMs 114 operating in a virtual environment on the host device 102 to access capabilities of endpoint devices 106. A full capability of any endpoint device 106 can be exposed to any of the VMs 114 via the root complex 112. The root complex 112 includes root ports 116*a*, 116*b*. The switch 104 includes an upstream port 122 and downstream ports 124*a*, 124*b*.

Each endpoint device 106 includes m number of physical functions (PFs) 118 (e.g., PF0, PF1, . . . , PFm), and each physical function 118 has n number of associated virtual functions (VFs) 120 (e.g., VF0, 1, . . . , n). In some examples, a PF 118 includes PCIe functions and is accessible to a virtualization intermediary and VMs 114. A PF 118 can have a full set of PCIe configuration space. In some examples, a VF 120 includes lightweight PCIe functions that contain resources for data movement and is directly accessible by a VM 114. A VF 120 is associated with a PF 118 and does not have a distinct configuration space. The VF 120 can share the same device type and PCIe capabilities as the associated PF 118.

A PCIe link 126 communicatively connects the root port 116*a* of the root complex 112 to the endpoint device 106*a*. A PCIe link 126 communicatively connects the root port 116*b* of the root complex 112 to the upstream port 122 of the switch 104. A PCIe link 126 communicatively connects the downstream port 124*a* to the endpoint device 106*b*. A PCIe link 126 communicatively connects the downstream port 124*b* to the endpoint device 106*c*.

In some examples, Intel® VT-d technology can be implemented to share the endpoint devices 106 among the VMs 114. In such examples, endpoint devices 106 can be directly passed through to VMs 114. With VT-d technology, VMs 114 can access the endpoint devices 106 directly, and a hypervisor does not perform input/output proxy. Traffic between VMs 114 and endpoint devices 106 can be transparent to a hypervisor.

In some examples, SR-IOV (developed by the Peripheral Component Interconnect Special Interest Group (PCI-SIG)) is implemented and provides a standard mechanism for endpoint devices 106 to advertise capability to be simultaneously shared among many VMs 114. With SR-IOV capability, VMs 114 can access the functions of the endpoint devices 106 directly. A hypervisor does not perform input/output proxy, and traffic between VMs 114 and endpoint devices 106 can be transparent to a hypervisor.

Figure 2:
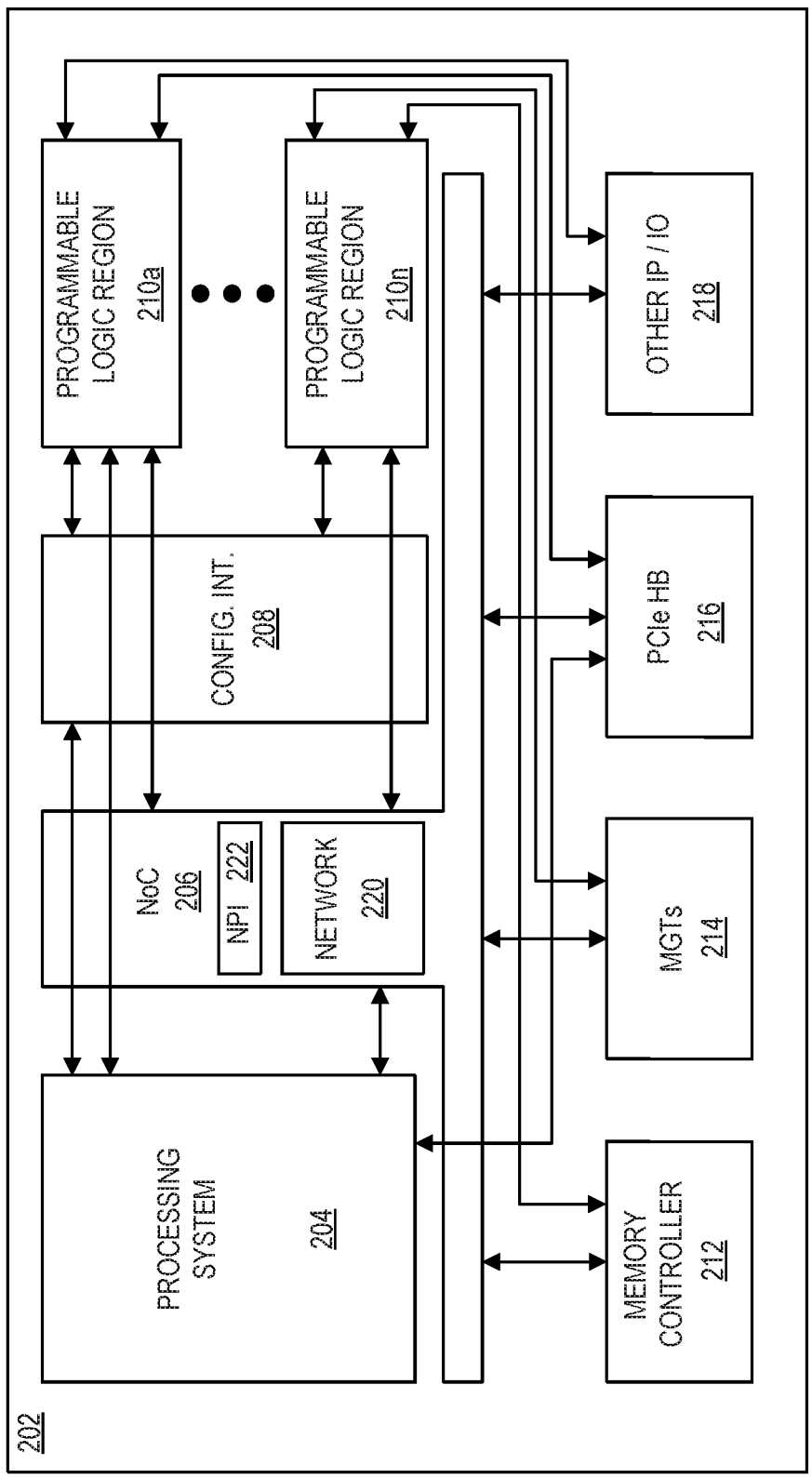
FIG. 2 is a block diagram depicting a programmable integrated circuit (IC) according to some examples.

FIG. 2 is a block diagram depicting a programmable integrated circuit (IC) 202 according to some examples. The programmable IC 202 can be a SoC, and can include or be an IC that is a programmable logic device, such as a FPGA. The programmable IC 202 comprises a processing system 204, a network-on-chip (NoC) 206, a configuration interconnect 208, one or more programmable logic regions 210*a* through 210*n* (generically, individually, or collectively, "programmable logic region(s) 210"), a memory controller 212, multi-gigabit transceivers (MGTs) 214, a PCIe hardblock (HB) circuit 216, and other IP and/or input/output (IO) (IP/IO) circuits 218. The NoC 206 includes a routing network 220 and a NoC peripheral interconnect (NPI) 222.

In general, the processing system 204 is connected to the programmable logic region(s) 210 through the configuration interconnect 208. The processing system 204, programmable logic region(s) 210, memory controller 212, MGTs 214, PCIe HB circuit 216, and other IP/IO circuits 218 are also connected to the NoC 206 (e.g., the routing network 220), and hence, may be communicatively coupled to each other via the NoC 206 (e.g., the routing network 220). The processing system 204, memory controller 212, MGTs 214, PCIe HB circuit 216, and other IP/IO circuits 218 are also connected to respective subsets of the programmable logic region(s) 210. For example, each of the processing system 204, PCIe HB circuit 216, and other IP/IO circuits 218 is connected to the programmable logic region 210*a*, and each of the memory controller 212 and MGTs 214 is connected to the programmable logic region 210*n*. The various circuits can be connected to any subset of the programmable logic region(s) 210, and the circuits may be connected in any combination with any other circuits to a given subset of the programmable logic region(s) 210.

The processing system 204 can include one or more processor cores. For example, the processing system 204 can include a number of ARM-based embedded processor cores.

The programmable logic region(s) 210 can include any number of configurable logic blocks (CLBs), look-up tables (LUTs), digital signal processing blocks (DSPs), random access memory blocks (BRAMs), etc., and programmable interconnect elements. The programmable logic region(s) 210 may be programmed or configured using the processing system 204 through the configuration interconnect 208. For example, the configuration interconnect 208 can enable, for example, frame-based programming of the fabric of the programmable logic region(s) 210 by a processor core of the processing system 204 (such as a platform management controller (PMC)).

The routing network 220 of the NoC 206 provides routing of NoC packets between different systems or circuits. The routing network 220 includes NoC packet switches interconnected by line segments, which are between NoC master units (NMUs) and NoC slave units (NSUs). Each NMU is an ingress circuit that connects a master circuit to the NoC 206. Each NSU is an egress circuit that connects the NoC 206 to a slave endpoint circuit. Each NoC packet switch performs switching of NoC packets. Hence, the NMUs, NoC packet switches, and NSUs can be configured to provide a channel for communications between a master endpoint circuit to a slave endpoint circuit via an NMU, NoC packet switches interconnected by line segments, and an NSU. The NMUs, NoC packet switches, and NSUs also include register blocks, which are written to configure the respective NMU, NoC packet switch, and NSU. The register blocks can be written via the NPI 222. For example, a PMC of the processing system 204 can transmit memory mapped write requests to the NMUs, NoC packet switches, and NSUs via the NPI 222 to write to the register blocks to configure the NMUs, NoC packet switches, and NSUs. The NPI 222 can include interconnected NPI switches that can route the memory mapped write requests to the appropriate register block.

The PCIe HB circuit 216 can be any circuit configured to implement communications via a PCIe link. The PCIe HB circuit 216 can process a communication (e.g., a PCIe message) in a transaction layer, a data link layer, and a physical layer, such as according to the PCIe standard. The PCIe HB circuit 216 can also be connected to the processing system 204, such as illustrated in FIG. 2.

The other IP/IO circuits 218 can be or include any input/output circuit to communicatively couple the programmable IC 202 with other circuits and/or systems. In some examples, the other IP/IO circuits 218 can include high bandwidth memory (HBM) interface circuits, high density input/output (HDIO) circuits, eXtreme Performance Input/Output (XPIO) circuits, and/or the like. The other IP/IO circuits 218 can also be or include, for example, digital clock managers, analog-to-digital converters, system monitoring logic, and/or any circuit for a given implementation. In some examples, at least some of the memory controller 212, MGTs 214, and/or other IP/IO circuits 218 are configurable. For example, the memory controller 212, MGTs 214, and/or other IP/IO circuits 218 can be configurable via the NPI 222 of the NoC 206.

Figure 3:
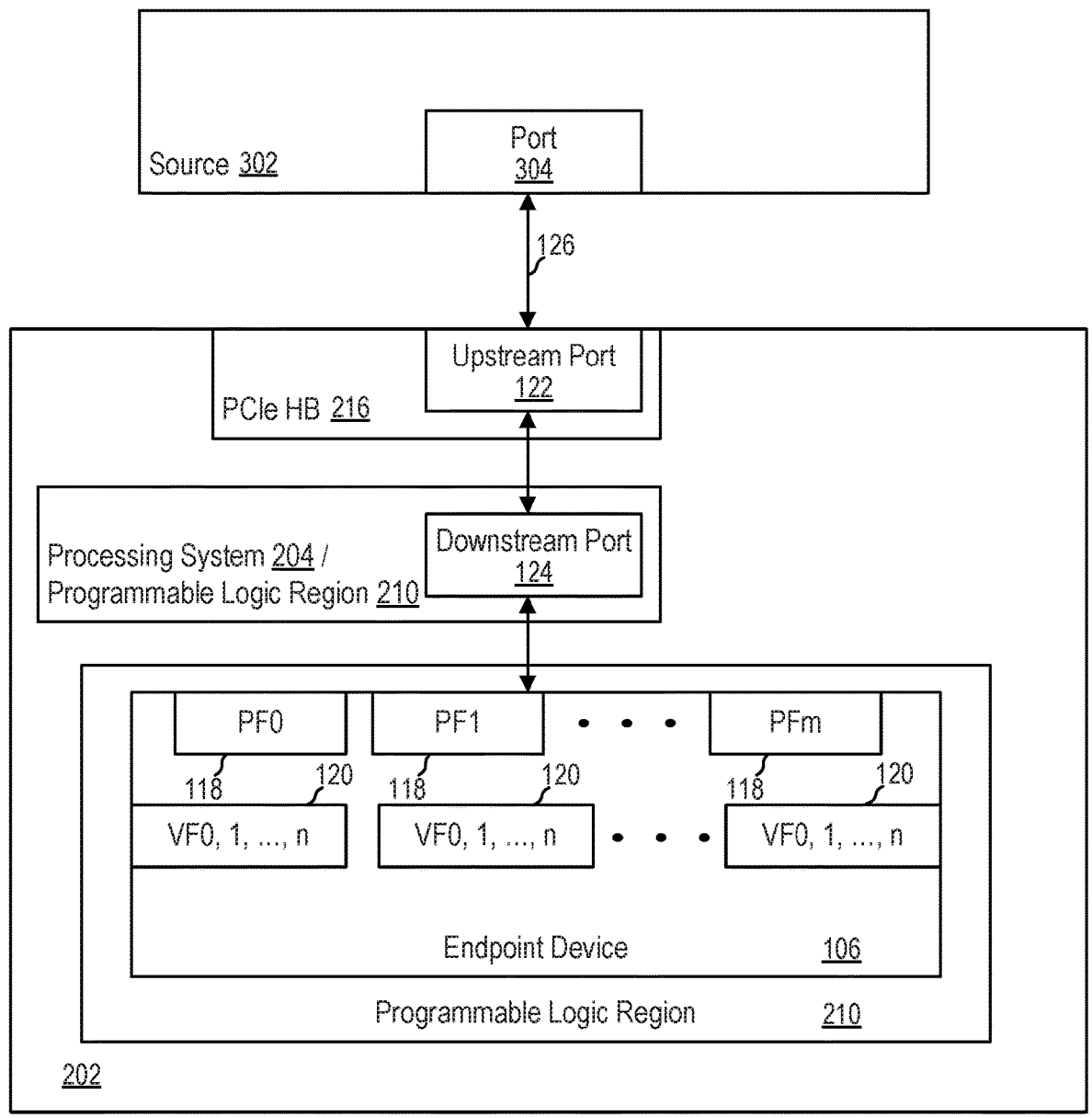
FIG. 3 depicts a simplified schematic block diagram of a customizable virtual device implemented on a programmable IC according to some examples.

FIG. 3 depicts a simplified schematic block diagram of a customizable virtual device implemented on a programmable IC 202 according to some examples. A virtual switch is implemented on the programmable IC 202 in FIG. 3. The virtual switch is implemented by an upstream port 122 implemented by a PCIe HB circuit 216 and a downstream port 124 implemented by the processing system 204 and/or programmable logic region 210. An endpoint device 106 is implemented in the programmable logic region 210, which may be the same or different programmable logic region 210 in which any portion of the downstream port 124 is implemented. The upstream port 122 is communicatively connected to the downstream port 124, and the downstream port 124 is communicatively connected to the endpoint device 106.

A source 302 has a port 304 and is communicatively connected by the port 304 to the upstream port 122 of the virtual switch implemented on the programmable IC 202. The source 302 and port 304 can be, for example, a root complex and root port (like the root complex 112 and root port 116 of FIG. 1) or a switch and downstream port (like the switch 104 and downstream port 124 of FIG. 1).

The device type and PCIe capabilities of the endpoint device 106 can be customized. The endpoint device 106 can be customizable to implement any device type and any number of PFs 118 and/or VFs 120. The downstream port 124 can be customizable and configurable due to the implementation of the downstream port 124 in a processing system 204 and/or programmable logic region 210, e.g., in a user design, and similarly, the endpoint device 106 can be customizable and configurable due to the implementation of the endpoint device 106 in a programmable logic region 210, e.g., in a user design. For example, the SR-IOV capability and vendor-defined PCIe capabilities can be added into the PCIe capabilities list. In some examples, the endpoint device 106 can be customized as a PCIe SR-IOV capable endpoint device, and the virtualized PCIe endpoint device can support any device type and any number of PFs 118 and/or VFs 120.

Figure 4:
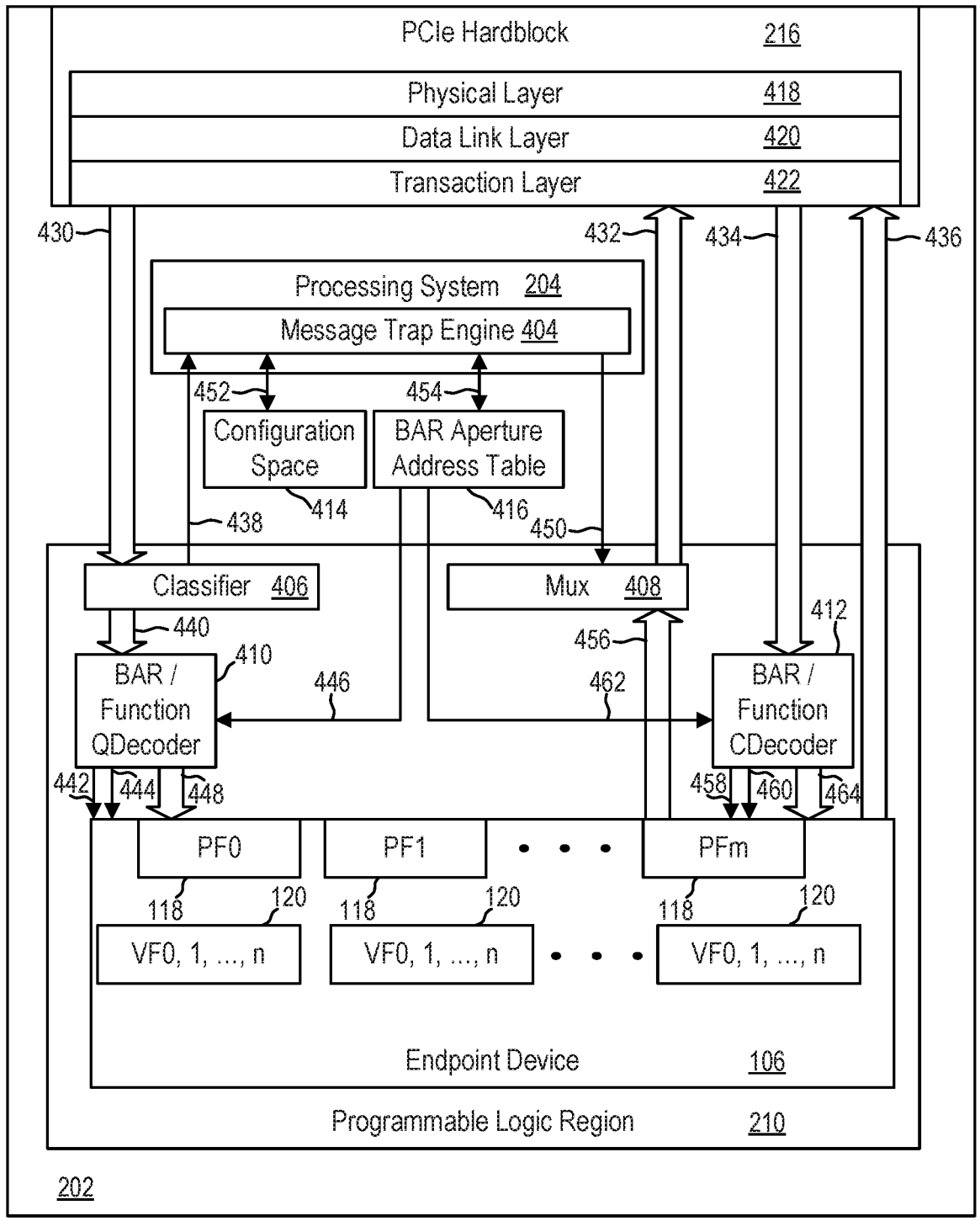
FIG. 4 depicts a schematic block diagram of a customizable virtual device implemented on a programmable IC according to some examples.

FIG. 4 depicts a schematic block diagram of a customizable virtual device implemented on a programmable IC 202 according to some examples. FIG. 4 illustrates additional detail of the virtual switch of FIG. 3. The virtual switch can be considered as including the PCIe HB circuit 216, a message trap engine module 404, a classifier module 406, a multiplexer (mux) module 408, a Base Address Register (BAR) and function ("BAR/Function") reQuest (Q) decoder ("QDecoder") 410, and a BAR/Function Completion (C) decoder ("CDecoder") 412.

Generally, the message trap engine module 404 virtualizes the downstream port of the virtual switch. The message trap engine module 404 maintains a configuration space 414 for each of the virtualized downstream port and the endpoint device 106. The message trap engine module 404 exposes virtualized busses for the downstream port and the endpoint device 106, and those buses are assigned respective bus numbers during enumeration. Hence, the endpoint device 106 is exposed to a root complex (e.g., and further to a VM operating on a host) by operation of the message trap engine module 404.

The message trap engine module 404 further maintains a BAR aperture address table 416. A message signal interrupt (MSI) and MSI-X (MSI/MSI-X) vector space table can also be implemented and maintained by the message trap engine module 404. The configuration space 414, the BAR aperture address table 416, and, if implemented, the MSI/MSI-X vector space table can be implemented, for example, in any memory in the programmable IC, such as in BRAM in the programmable logic region 210 and/or random access memory (RAM) in the processing system 204, or in any memory off of the programmable IC, such as in a separate memory chip or chip including a processor with memory.

The PCIe HB circuit 216 can include a physical layer 418, a data link layer 420, and a transaction layer 422, and can also be configured as an upstream port of the virtual switch. The PCIe HB circuit 216 is communicatively connected to a root complex and handles PCIe messages. The PCIe HB circuit 216 is capable of transmitting and receiving PCIe messages via a Completer reQuest (CQ) bus 430, a Completer Completion (CC) bus 432, a Request Completion (RC) bus 434, and a Requester reQuest (RQ) bus 436. More specifically, the PCIe HB circuit 216 is capable of forwarding Type1 PCIe configuration transactions and other PCIe messages.

The classifier module 406 is capable of receiving PCIe messages from the PCIe HB circuit 216 via the CQ bus 430. The PCIe messages received at the classifier module 406 are PCIe requests from a root complex. The classifier module 406 is capable of distinguishing PCIe Type 1 configuration transactions from other PCIe messages, such as by identifying the type of the PCIe message from the type field in the header of the PCIe message. The classifier module 406 is further capable of forwarding PCIe Type 1 configuration transactions to the message trap engine module 404 via connection 438 and forwarding non-PCIe Type 1 configuration transactions (e.g., memory or IO read or write messages) to the BAR/Function QDecoder 410 via a CQ bus 440.

The BAR/Function QDecoder 410 is capable of decoding the address field of PCIe Transaction Layer Packet (TLP) messages transmitted on the CQ bus 440 and transmitting to the endpoint device 106 which function (function ID) and BAR (BAR ID) is being accessed via connections 442 and 444, respectively. The BAR/Function QDecoder 410 is capable of searching the BAR aperture address table 416, via connection 446, by the address field in the PCIe TLP messages to obtain the function ID and BAR ID. The BAR/Function QDecoder 410 is further capable of transmitting messages to the endpoint device 106 via a CQ bus 448. The function ID and BAR ID from the BAR/Function QDecoder 410 can be used in the endpoint device 106 in the programmable logic region 210 to determine which function and BAR is being accessed. The endpoint device 106 in the programmable logic region 210 can implement features such as networking (e.g., an Ethernet MAC that converts PCIe TLP packets to Ethernet packets), storage, etc. The endpoint device 106 can be customizable due to the endpoint device 106 being designed in a user design and implemented in the programmable logic region 210.

The message trap engine module 404 is capable of receiving the PCIe Type 1 configuration transactions via connection 438 and responding to the PCIe Type 1 configuration transactions via connection 450 to multiplexer module 408. The message trap engine module 404 analyzes the PCIe Type 1 configuration transactions and responds accordingly. The message trap engine module 404 receives the PCIe Type 1 configuration transactions and distinguishes which kind of device is being accessed by the bus number and device identification (ID) in the PCIe TLP transactions. If the host is accessing the downstream port of the virtual switch, the message trap engine module 404 responds using the configuration space 414 of the downstream port of the virtual switch. If the host is accessing the endpoint device 106, the message trap engine module 404 responds using the configuration space 414 of the endpoint device 106. The configuration of the endpoint device 106 in the programmable logic region 210 (as maintained in the configuration space 414) depends on how the message trap engine module 404 responds to the PCIe Type 1 configuration transactions. If the host is accessing a bus number beyond what the programmable IC 202 supports, the message trap engine module 404 responds with an unsupported request message. The configuration spaces 414 of the downstream port of the virtual switch and the endpoint device 106 can be customizable.

The configuration space 414 is capable of storing a configuration registers space for one or more PFs and a configuration registers space for each VF associated with each respective PF. The BAR aperture address table 416 is capable of storing each BAR aperture address for the PFs and VFs. A MSI/MSI-X vector space table can be implemented to store the MSI/MSI-X vectors of each physical function. The configuration space 414, BAR aperture address table 416, and, if implemented, the MSI/MSI-X vector space table can be initialized by the message trap engine module 404. The message trap engine module 404 analyzes the PCIe Type 1 configuration transactions and is capable of reading or storing, as appropriate, data to the configuration space 414 via connection 452 and BAR aperture addresses of the VFs in the BAR aperture address table 416 via connection 454. When the message trap engine module 404 receives PCIe Type 1 configuration write transactions, the message trap engine module 404 stores the registers into a configuration space of a corresponding PF. The message trap engine module 404 can initialize the MSI/MSI-X vector table for each PF and the BAR aperture.

The message trap engine module 404 presents the type of the endpoint device 106 and PCIe capabilities of the endpoint device 106, such as SR-IOV, MSI-X, etc. The configuration space can be customized by using the message trap engine module 404, so different PCIe capabilities and device types can be present. More particularly, the configuration space 414, which is exposed by the message trap engine module 404 and which presents the endpoint device 106 and functions, can be customized in a user design and implemented in the programmable IC 202. Implementing the configuration space 414 and message trap engine module 404 in a programmable IC 202 permits capabilities to be added and/or customized in the programmable IC 202 by the user design. For example, the message trap engine module 404 can initialize SR-IOV capabilities and set the VFs that are supported. Also, the endpoint device 106 can be customized as a multifunction device to support any number of physical functions.

As illustrated, the message trap engine module 404 can be implemented in the processing system 204, such as by firmware or other software executing on a core or controller of the processing system 204. In other examples, the message trap engine module 404 can be implemented by a processor (e.g., a CPU) external to the programmable IC 202 and/or by configured logic in the programmable logic region 210.

The multiplexer module 408 is capable of time multiplexing the PCIe Type 1 configuration transaction response messages received via the connection 450 and PCIe response messages received from the endpoint device 106 in the programmable logic region 210 via a CC bus 456 (e.g., responses for completion of requests, such as memory read operations, requested from a root complex). The multiplexer module 408 is capable of transmitting response messages to the PCIe HB circuit 216 via the CC bus 432.

The endpoint device 106 in the programmable logic region 210 can transmit PCIe request messages via the RQ bus 436. The PCIe messages transmitted on the RQ bus 436 are request messages from the endpoint device 106 in the programmable logic region 210.

The BAR/Function CDecoder 412 is capable of decoding the address field of PCIe TLP messages transmitted on the RC bus 434 and transmitting to the endpoint device 106 in the programmable logic region 210 which function (function ID) and BAR (BAR ID) is being accessed via connections 458 and 460, respectively. The PCIe TLP messages transmitted on the RC bus 434 are completion messages for the request messages from the endpoint device 106 in the programmable logic region 210. The BAR/Function CDecoder 412 is capable of searching the BAR aperture address table 416, via connection 462, by the address field in the PCIe TLP messages to obtain the function ID and BAR ID. The BAR/Function CDecoder 412 is further capable of transmitting messages to the programmable logic region 210 via a RC bus 464. The function ID and BAR ID from the BAR/Function CDecoder 412 can be used in the endpoint device 106 in the programmable logic region 210 to determine which function and BAR is being accessed.

Figure 5:
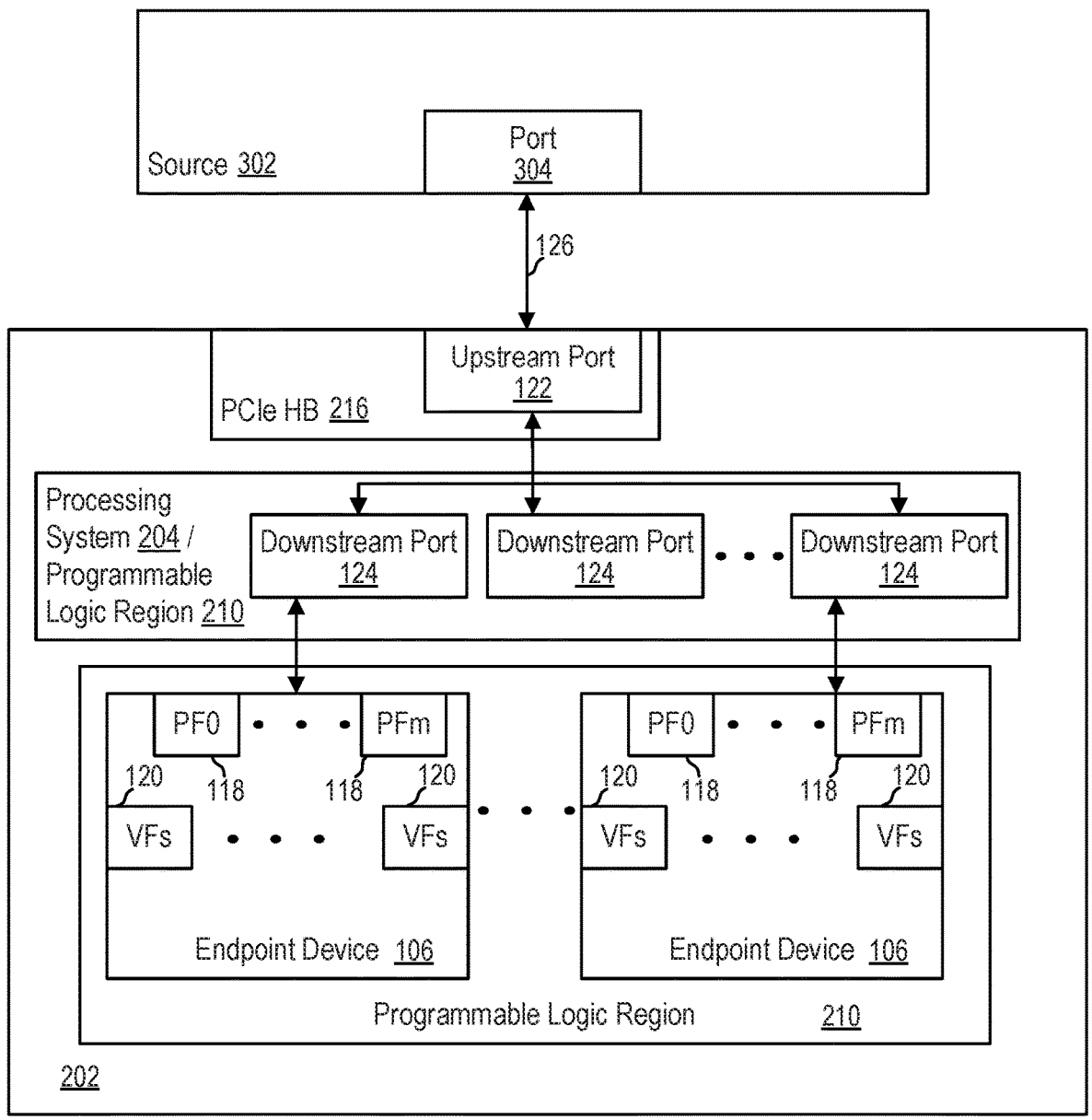
FIG. 5 depicts a simplified schematic block diagram of a customizable virtual device implemented on a programmable IC according to some examples.

FIG. 5 depicts a simplified schematic block diagram of a customizable virtual device implemented on a programmable IC 202 according to some examples. A virtual switch is implemented on the programmable IC 202 in FIG. 5. The virtual switch is implemented by an upstream port 122 implemented by a PCIe HB circuit 216 and multiple downstream ports 124 (e.g., up to 32 downstream ports 124) implemented by the processing system 204 and/or programmable logic region 210. Multiple endpoint devices 106 are implemented in the programmable logic region 210, which may be the same or different programmable logic region 210 in which any portion of the downstream ports 124 are implemented. The upstream port 122 is communicatively connected to the downstream ports 124 by a virtualized internal bus, and various downstream ports 124 are communicatively connected to respective endpoint devices 106. Capabilities of the downstream ports 124 can be customizable, such as to support a hot-pluggable feature. Other aspects of FIG. 5 are as described above with respect to FIG. 3.

Figure 6:
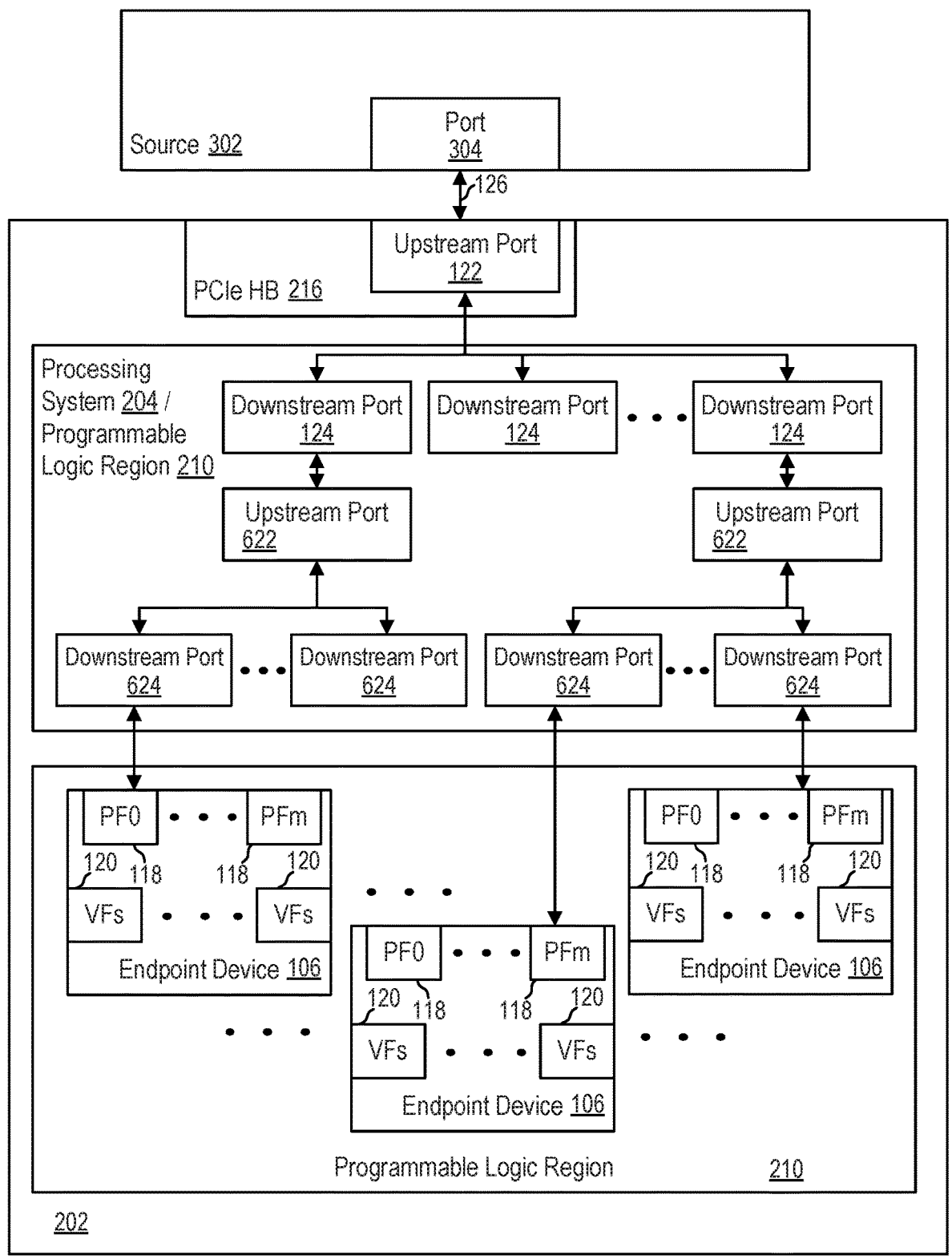
FIG. 6 depicts a simplified schematic block diagram of a customizable virtual device implemented on a programmable IC according to some examples.

FIG. 6 depicts a simplified schematic block diagram of a customizable virtual device implemented on a programmable IC 202 according to some examples. A two-layer virtual switch is implemented on the programmable IC 202 in FIG. 6. In further examples, any number of layers switch may be implemented. The two-layer virtual switch is implemented in a first layer by an upstream port 122 implemented by a PCIe HB circuit 216 and multiple downstream ports 124 (e.g., up to 32 downstream ports 124) implemented by the processing system 204 and/or programmable logic region 210, and in a second layer by upstream ports 622 and downstream ports 624 (e.g., up to 32 downstream ports 624 per upstream port 622) implemented by the processing system 204 and/or programmable logic region 210, which may be the same or different programmable logic region 210 in which any portion of the ports 124, 622, 624 are implemented. Multiple endpoint devices 106 are implemented in the programmable logic region 210. In the first layer, the upstream port 122 is communicatively connected to the downstream ports 124 by a virtualized internal bus, and in the second layer, the upstream ports 622 are communicatively connected to respective groups of downstream ports 624 by respective virtualized internal busses. Various downstream ports 124 of the first layer are communicatively connected to respective upstream ports 622 of the second layer. Various downstream ports 624 are communicatively connected to respective endpoint devices 106. Capabilities of the downstream ports 124, 624 can be customizable, such as to support a hot-pluggable feature. Other aspects of FIG. 6 are as described above with respect to FIG. 3.

The device type and PCIe capabilities of the endpoint devices 106 of FIGS. 5 and 6 can be customized. The endpoint devices 106 can be customizable to implement any device type and any number of PFs 118 and/or VFs 120. The ports 124, 622, 624 can be customizable and configurable due to the implementation of the ports 124, 622, 624 in a processing system 204 and/or programmable logic region 210, e.g., in a user design, and similarly, the endpoint devices 106 can be customizable and configurable due to the implementation of the endpoint devices 106 in a programmable logic region 210, e.g., in a user design. For example, the SR-IOV capability and vendor-defined PCIe capabilities can be added into the PCIe capabilities list. In some examples, the endpoint devices 106 can be customized as a PCIe SR-IOV capable endpoint devices, and the virtualized PCIe endpoint devices can support any device type and any number of PFs 118 and/or VFs 120.

According to examples such as in FIGS. 5 and 6, a virtual switch and customizable endpoint devices 106 can be implemented in a programmable IC 202. If more than 32 endpoint devices 106 are to be implemented, a two-layer virtual switch can be implemented. If less than 32 endpoint devices 106 are to be implemented, a one-layer virtual switch can be implemented.

Figure 7:
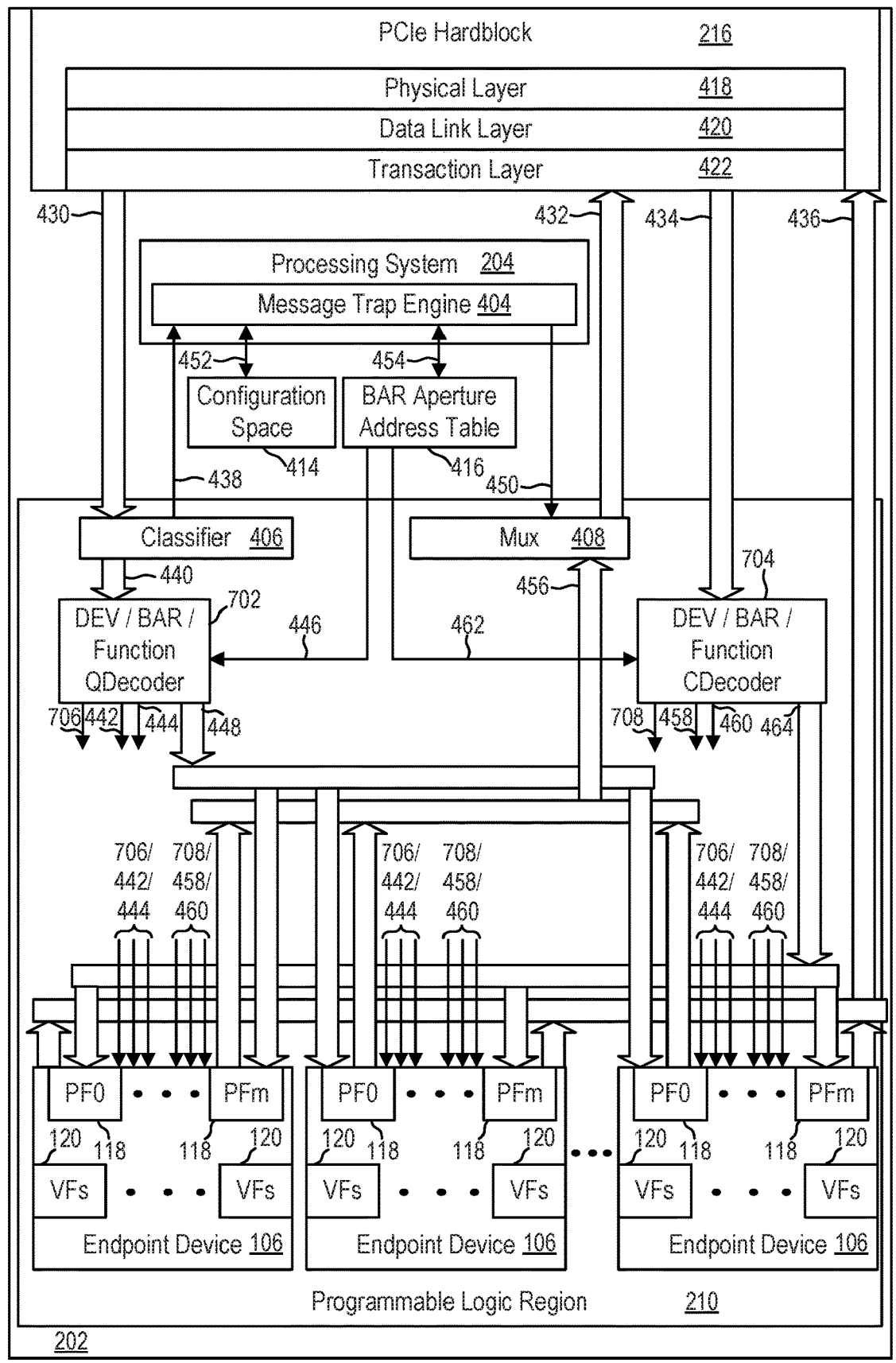
FIG. 7 depicts a schematic block diagram of a customizable virtual device implemented on a programmable IC according to some examples.

FIG. 7 depicts a schematic block diagram of a customizable virtual device implemented on a programmable IC 202 according to some examples. FIG. 7 illustrates additional detail of a one or multiple-layer virtual switch, such as illustrated in FIG. 5 or 6. The PCIe HB circuit 216 is the same or similar as described above with respect to FIG. 4, and description of such is omitted here for brevity. In FIG.

7, a device (DEV), BAR, and/or function (DEV/BAR/Function) QDecoder 702 and a DEV/BAR/Function CDecoder 704 replace the BAR/Function QDecoder 410 and BAR/Function CDecoder 412, respectively, of FIG. 4.

Like in FIG. 4, generally, the message trap engine module 404 virtualizes the downstream ports and any upstream ports of a second or more layer of the virtual switch. The message trap engine module 404 maintains a configuration space 414 for each of the virtualized ports and the endpoint devices 106. The message trap engine module 404 exposes virtualized busses for the virtualized ports and the endpoint devices 106, and those buses are assigned respective bus numbers during enumeration. Hence, the endpoint devices 106 are exposed to a root complex (e.g., and further to a VM operating on a host) by operation of the message trap engine module 404.

The message trap engine module 404 further maintains a BAR aperture address table 416. A MSI/MSI-X vector space table can also be implemented and maintained by the message trap engine module 404. The configuration space 414, the BAR aperture address table 416, and, if implemented, the MSI/MSI-X vector space table can be implemented, for example, in any memory in the programmable IC, such as in BRAM in the programmable logic region 210 and/or RAM in the processing system 204, or in any memory off of the programmable IC, such as in a separate memory chip or chip including a processor with memory.

The classifier module 406 is capable of receiving PCIe messages via the CQ bus 430. The PCIe messages received at the classifier module 406 are PCIe requests from a root complex. The classifier module 406 is capable of distinguishing PCIe Type 1 configuration transactions from other PCIe messages, such as by identifying the type of the PCIe message from the type field in the header of the PCIe message. The classifier module 406 is further capable of forwarding PCIe Type 1 configuration transactions to the message trap engine module 404 via connection 438 and forwarding non-PCIe Type 1 configuration transactions (e.g., memory or IO read or write messages) to the BAR/Function QDecoder 410 via a CQ bus 440.

The DEV/BAR/Function QDecoder 702 is capable of decoding the address field of PCIe TLP messages transmitted on the CQ bus 440 and transmitting to the endpoint devices 106 which endpoint device 106 (device ID), function (function ID), and BAR (BAR ID) is being accessed via connections 706, 442, and 444, respectively. The DEV/BAR/Function QDecoder 702 is capable of searching the BAR aperture address table 416, via connection 446, by the address field in the PCIe TLP messages to obtain the device ID, function ID, and BAR ID. The DEV/BAR/Function QDecoder 702 is further capable of transmitting messages to the endpoint devices 106 via a CQ bus 448. The device ID, function ID, and BAR ID from the DEV/BAR/Function QDecoder 702 can be used in the endpoint devices 106 in the programmable logic region 210 to determine which endpoint device 106, function, and BAR is being accessed. The endpoint devices 106 in the programmable logic region 210 can implement features such as networking (e.g., an Ethernet MAC that converts PCIe TLP packets to Ethernet packets), storage, etc. The endpoint devices 106 can be customizable due to the endpoint device 106 being designed in a user design and implemented in the programmable logic region 210.

The message trap engine module 404 is capable of receiving the PCIe Type 1 configuration transactions via connection 438 and responding to the PCIe Type 1 configuration transactions via connection 450 to multiplexer module 408. The message trap engine module 404 analyzes the PCIe Type 1 configuration transactions and responds accordingly. The message trap engine module 404 receives the PCIe Type 1 configuration transactions and distinguishes which kind of device is being accessed by the bus number and device ID in the PCIe TLP transactions. If the host is accessing any downstream port of the virtual switch, the message trap engine module 404 responds using the configuration space 414 of the respective downstream port of the virtual switch. If the host is accessing any endpoint device 106, the message trap engine module 404 responds using the configuration space 414 of the respective endpoint device 106. The respective configurations of the endpoint devices 106 in the programmable logic region 210 (as maintained in the configuration space 414) depend on how the message trap engine module 404 responds to the PCIe Type 1 configuration transactions. If the host is accessing a bus number beyond what the programmable IC 202 supports, the message trap engine module 404 responds with an unsupported request message. The configuration spaces 414 of the virtualized ports of the virtual switch and the endpoint devices 106 can be customizable.

The configuration space 414 is capable of storing a configuration registers space for each of the endpoint devices 106, for one or more PFs of the respective endpoint device 106, and for each VF associated with each respective PF. It is possible to share configuration space of PFs as one profile if the PFs are the same device type. The BAR aperture address table 416 is capable of storing each BAR aperture address for the PFs and VFs of each of the endpoint devices 106. A MSI/MSI-X vector space table can be implemented to store the MSI/MSI-X vectors of each physical function of each endpoint device 106. The configuration space 414, BAR aperture address table 416, and, if implemented, the MSI/MSI-X vector space table can be initialized by the message trap engine module 404. The message trap engine module 404 analyzes the PCIe Type 1 configuration transactions and is capable of reading or storing, as appropriate, data to the configuration space 414 via connection 452 and BAR aperture addresses of the VFs of each endpoint device 106 in the BAR aperture address table 416 via connection 454. When the message trap engine module 404 receives PCIe Type 1 configuration write transactions, the message trap engine module 404 stores the registers into a configuration space of a corresponding PF. The message trap engine module 404 can initialize the MSI/MSI-X vector table for each PF and the BAR aperture.

The message trap engine module 404 presents the respective types of the endpoint devices 106 and PCIe capabilities of the endpoint devices 106, such as SR-IOV, MSI-X, etc. The message trap engine module 404 also presents the PCIe capabilities of virtualized downstream and upstream ports of the virtual switch. The configuration space can be customized by using the message trap engine module 404, so different PCIe capabilities and device types can be present. More particularly, the configuration space, which is exposed by the message trap engine module 404 and which presents the endpoint devices 106 and functions, can be customized in a user design and implemented in the programmable IC 202. Implementing the configuration space and message trap engine module 404 in a programmable IC 202 permits capabilities to be added and/or customized in the programmable IC 202 by the user design. For example, the message trap engine module 404 can initialize SR-IOV capabilities and set the VFs that are supported. Also, the endpoint device 106 can be customized as a multifunction device to support any number of physical functions.

As illustrated, the message trap engine module 404 can be implemented in the processing system 204, such as by firmware or other software executing on a core or controller of the processing system 204. In other examples, the message trap engine module 404 can be implemented by a processor (e.g., a CPU) external to the programmable IC 202 and/or by configured logic in the programmable logic region 210.

The multiplexer module 408 is capable of multiplexing the PCIe Type 1 configuration transaction response messages received via the connection 450 and PCIe response messages received from the endpoint devices 106 in the programmable logic region 210 via a CC bus 456 (e.g., responses for completion of requests, such as memory read operations, requested from a root complex). The multiplexer module 408 is capable of transmitting response messages via the CC bus 432.

The endpoint device 106 in the programmable logic region 210 can transmit PCIe request messages via the RQ bus 436. The PCIe messages transmitted on the RQ bus 436 are request messages from the endpoint device 106 in the programmable logic region 210.

The DEV/BAR/Function CDecoder 704 is capable of decoding the address field of PCIe TLP messages transmitted on the RC bus 434 and transmitting to the endpoint devices 106 in the programmable logic region 210 which endpoint device 106 (device ID), function (function ID), and BAR (BAR ID) is being accessed via connections 708, 458, and 460, respectively. The PCIe TLP messages transmitted on the RC bus 434 are completion messages for the request messages from one or more endpoint devices 106 in the programmable logic region 210. The DEV/BAR/Function CDecoder 704 is capable of searching the BAR aperture address table 416, via connection 462, by the address field in the PCIe TLP messages to obtain the device ID, function ID, and BAR ID. The DEV/BAR/Function CDecoder 704 is further capable of transmitting messages to the programmable logic region 210 via a RC bus 464. The device ID, function ID, and BAR ID from the DEV/BAR/Function CDecoder 704 can be used in endpoint devices 106 in the programmable logic region 210 to determine which device, function, and BAR is being accessed.

Figure 8:
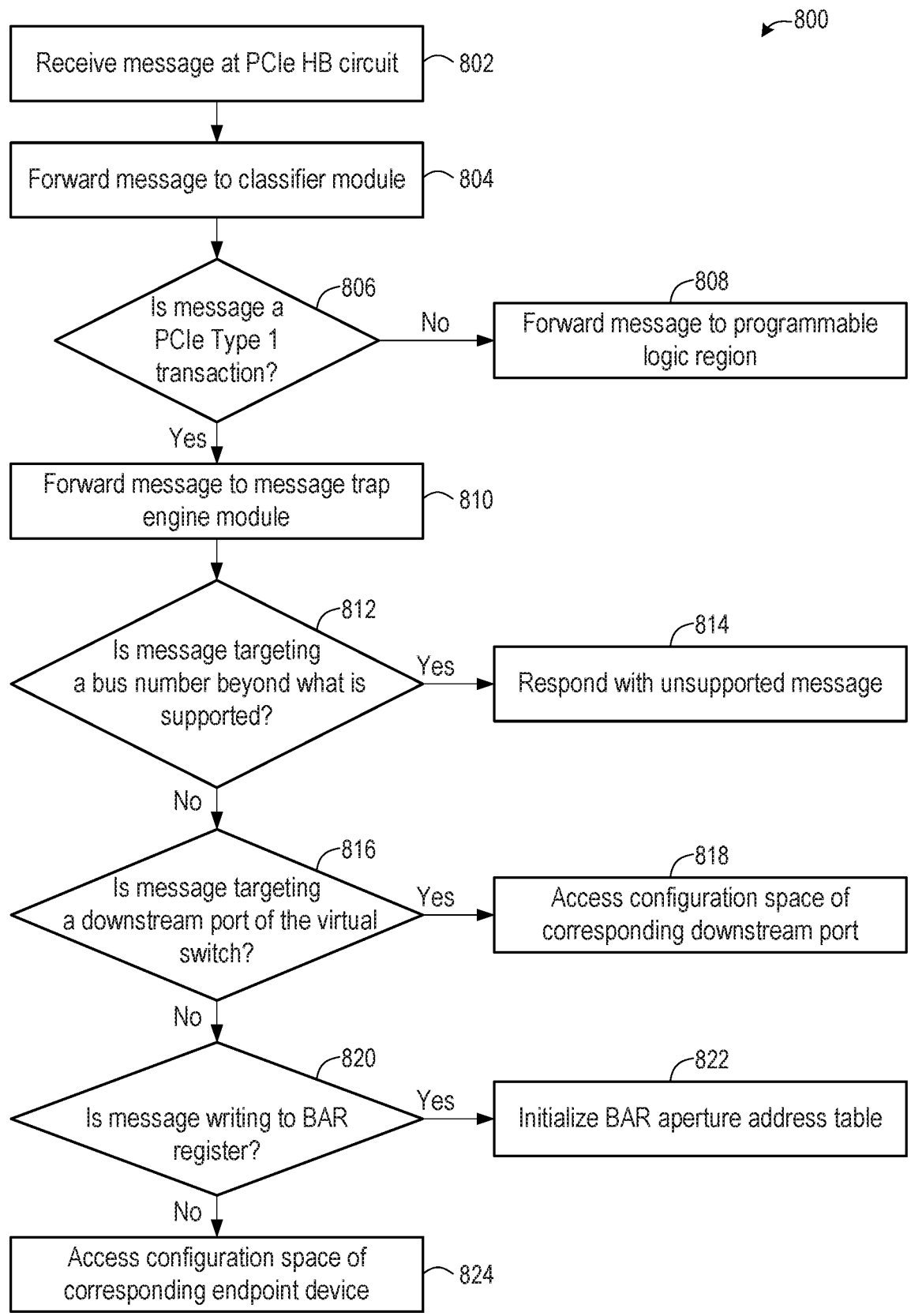
FIG. 8 is a flow chart of a method for processing a request message received at a virtualized device according to some examples.

FIG. 8 is a flow chart of a method 800 for processing a request message received at a virtualized device according to some examples. The virtualized device can be, for example, the device of FIG. 4 or 7. Any number or configuration of virtual switches can be implemented in the virtualized device, and any number of endpoint devices can be implemented in the virtualized device.

At block 802, a PCIe message is received at a PCIe HB circuit (e.g., PCIe HB circuit 216). The PCIe message can be from a root complex and may further be via any number of switches. The PCIe message can be a request message. The message can be processed at the PCIe HB circuit according to a physical (PHY) layer, a data link layer, and a transaction layer. At block 804, the PCIe message is forwarded to a classifier module (e.g., classifier module 406) from the PCIe HB circuit.

At block 806, the classifier module determines whether the PCIe message is a PCIe Type 1 configuration transaction, such as described above. If the PCIe message is not a PCIe Type 1 configuration transaction, at block 808, the classifier module forwards the message to one or more endpoint devices in a programmable logic region (e.g., one or more endpoint devices 106 in the programmable logic region 210). If the PCIe message is a PCIe Type 1 configuration transaction as determined by block 806, the PCIe message is forwarded to the message trap engine module (e.g., message trap engine module 404) at block 810.

At block 812, the message trap engine module determines whether the PCIe message is targeting a bus number beyond what is supported by the virtualized device. If the PCIe message is determined to be targeting a bus number beyond what is supported at block 812, the message trap engine module responds that the PCIe message is unsupported at block 814.

If the PCIe message is determined at block 812 to be targeting a bus number that is supported, the message trap engine module determines whether the PCIe message is targeting a downstream port of the virtual switch at block 816. If the PCIe message is determined at block 816 to be targeting a downstream port of the virtual switch, the message trap engine module accesses (e.g., by writing to or reading from) the configuration space corresponding to the downstream port at block 818.

If the PCIe message is determined at block 816 to not be targeting a downstream port of the virtual switch, the message trap engine module determines whether the PCIe message is writing to a BAR register at block 820. If the PCIe message is determined at block 820 to be writing to a BAR register, the message trap engine module initializes a BAR aperture address table at block 822. If the PCIe message is determined at block 820 to not be writing to a BAR register (and hence, is determined to be targeting an endpoint device), the message trap engine module accesses (e.g., by writing to or reading from) a configuration space of a corresponding endpoint device at block 824.

Various examples can be embodied or implemented in a number of different ways. When implementing a design on a programmable IC (an example of which is illustrated in FIG. 2), e.g., an FPGA SoC, a user can create a user design using a software design tool. An example software design tool is the Vivado® Design Suite available from Xilinx, Inc. of San Jose, Calif. The software design tool can permit the user to create a design using a hardware description language (HDL), register transfer language (RTL), high-level synthesis (HLS) models, concurrent programming language (e.g., SystemC), or the like. The software design tool can also permit the user to create a design using primitives (e.g., representative of hardware circuit components) that are user defined and/or defined by the software design tool. The primitives can be connected by the user to implement a circuit schematic in the design. The software design tool can compile the user design into a file (e.g., boot image file) that includes one or more bitstreams and/or binaries that are capable of being loaded onto the programmable IC and executed by one or more subsystems of the programmable IC. For example, a bitstream can be loaded into a programmable logic region to configure the programmable logic region, and binaries can be loaded into memory of a processing system for execution by a processor of the processing system. The programmable IC, when loaded with the file and configured according to the file, can implement the user design as described above, e.g., with respect to FIGS. 4 and/or 7.

A supplier of the programmable IC and/or the supplier of the software design tool can provide one or more IP cores to the user for the user to incorporate, with or without modification, into the user design. For example, the IP cores can be packaged with the software design tool, which may be provided in a memory (e.g., a compact disc read only memory (CD-ROM)) supplied to the user, or which may be downloaded via a network (e.g., the Internet) from a memory, such as a server or database. Additionally, IP cores can be provided separate from the software design tool, and may be provided by a third-party. In such situations, IP cores can be provided in a memory (e.g., a CD-ROM) supplied to the user, and/or may be downloaded via a network (e.g., the Internet) from a memory, such as a server or database. IP cores can be provided using a number of delivery mechanisms. IP cores can be a file (e.g., stored in memory) that include, e.g., HDL, RTL, a HLS model, a concurrent programming language, a definition of one or more primitives, or a combination thereof.

Accordingly, some examples can be embodied as an IP core stored in non-transitory memory. For example, a design of FIGS. 4 and/or 7 can be embodied as an IP core stored in non-transitory memory. A user can be provided access to the IP core stored in the non-transitory memory. The user can incorporate the IP core into a user design with or without modification to the IP core. Further, some examples can be embodied as a file (e.g., a boot image file) that includes one or more bitstreams and/or binaries that is stored in non-transitory memory and is capable of being loaded onto and executed by the programmable IC. For example, the file can be a result of compiling and/or synthesizing a user design including the design of FIGS. 4 and/or 7. Even further, some examples can be embodied as a configured or programmed programmable IC. For example, a file can be loaded onto the programmable IC to program and/or configure the programmable IC to implement the design of FIGS. 4 and/or 7. Examples of non-transitory memory include RAM (e.g., static RAM (SRAM) and dynamic RAM (DRAM)), read only memory (ROM), programmable ROM (PROM), erasable programmable ROM (EPROM), electrically erasable programmable ROM (EEPROM), flash, NAND memory, CD-ROM, an optical storage device, a magnetic storage device, etc. The non-transitory memory, in some examples, can be standalone memory, can be included in any computing system (e.g., a desktop computer, a laptop computer, a server, a database, etc.) and/or can be memory disposed on a same board or in a same package or chip as the programmable IC (e.g., for loading a boot image file into the programmable IC).

With the number of cores of a CPU growing and with the emergence of container technology, support of more and more SR-IOV PFs and VFs in a PCIe endpoint device may be desirable. Some examples described herein permit a PCIe endpoint device to be customizable to support any device type and any number of PFs and VFs. As described herein, a programmable IC, such as an FPGA, can have integrated PCIe HB circuits that are SR-IOV capable. In some examples, an FPGA can enhance SR-IOV capabilities. Some examples contemplate virtualizing a customizable PCIe endpoint device in an FPGA. With the customization capability, the device can be any device type and any number of PFs and VFs. For example, PCIe endpoint device can be virtualized that supports over 256 functions that the device originally may not support.

For some applications, a hot-pluggable feature for PCIe endpoint devices may be desirable, such as for cloud service providers. With a hot-pluggable feature, a cloud service provider can manage PCIe endpoint devices dynamically and attach/de-attach PCIe endpoint devices to VMs without rebooting the VMs. To support a hot-pluggable feature, a PCIe switch can be implemented between a root complex and PCIe endpoint devices.

While the foregoing is directed to specific examples, other and further examples may be devised without departing from the basic scope thereof, and the scope thereof is determined by the claims that follow.

What is claimed is:

1. A non-transitory memory storing a representation of a design, the design to be implemented on a programmable integrated circuit, the design comprising:
    a classifier circuit capable of receiving a Peripheral Component Interconnect Express (PCIe) message and configured to determine whether the PCIe message is a PCIe Type 1 configuration transaction or is a non-PCIe Type 1 configuration transaction, the classifier circuit further being configured to forward the PCIe message to an endpoint device when the PCIe message is the non-PCIe Type 1 configuration transaction, the endpoint device being included in one or more endpoint devices;
    a message trap engine circuit, the classifier circuit further being configured to forward the PCIe message to the message trap engine circuit when the PCIe message is the PCIe Type 1 configuration transaction, the message trap engine circuit being configured to virtualize one or more downstream ports of a virtual switch;
    a respective configuration space of each endpoint device of the one or more endpoint devices maintained by the message trap engine circuit; and
    a respective configuration space of each downstream port of the one or more downstream ports maintained by the message trap engine circuit, the message trap engine circuit being capable of accessing the configuration space of a respective endpoint device or a respective downstream port in response to the PCIe message targeting the respective endpoint device of the one or more endpoint devices or the respective downstream port of the one or more downstream ports, respectively.

2. The non-transitory memory of claim 1, wherein the design further comprises the one or more endpoint devices, the one or more endpoint devices to be implemented in one or more programmable logic regions of the programmable integrated circuit.

3. The non-transitory memory of claim 1, wherein the design further comprises multiple endpoint devices, the multiple endpoint devices to be implemented in one or more programmable logic regions of the programmable integrated circuit.

4. The non-transitory memory of claim 1, wherein:
    the message trap engine circuit is to be implemented by a processor of the programmable integrated circuit; and
    the classifier circuit is to be implemented in one or more programmable logic regions of the programmable integrated circuit.

5. The non-transitory memory of claim 1, wherein the message trap engine circuit virtualizes multiple downstream ports of the virtual switch, the virtual switch being a single-layer switch.

6. The non-transitory memory of claim 1, wherein the message trap engine circuit virtualizes multiple downstream ports of the virtual switch, the virtual switch being a multi-layer switch.

7. The non-transitory memory of claim 1, wherein the design further includes a multiplexer circuit, the message trap engine circuit and the one or more endpoint devices being configured to respond to the PCIe message when the PCIe message is received by the message trap engine circuit and the respective endpoint device, respectively, the multiplexer circuit being configured to time multiplex and transmit received responses from the message trap engine circuit and the one or more endpoint devices.

8. The non-transitory memory of claim 1, wherein the programmable integrated circuit is a field programmable gate array (FPGA) System-on-Chip (SoC).

9. A method for operating a programmable integrated circuit, the method comprising:
   determining, by a classifier circuit on the programmable integrated circuit, whether a received Peripheral Component Interconnect Express (PCIe) message is a PCIe Type 1 configuration transaction or a non-PCIe Type 1 configuration transaction;
   forwarding the received PCIe message from the classifier circuit to an endpoint device of one or more endpoint devices on one or more programmable logic regions of the programmable integrated circuit when the received PCIe message is the non-PCIe Type 1 configuration transaction;
   forwarding the received PCIe message from the classifier circuit to a message trap engine circuit when the received PCIe message is the PCIe Type 1 configuration transaction, the message trap engine circuit virtualizing one or more downstream ports of a virtual switch, the message trap engine circuit maintaining:
      a respective configuration space of each endpoint device of the one or more endpoint devices; and
      a respective configuration space of each downstream port of the one or more downstream ports; and
   accessing, by the message trap engine circuit, the configuration space of a respective downstream port or a respective endpoint device when the received PCIe message targets the respective downstream port of the one or more downstream ports or the respective endpoint device of the one or more endpoint devices, respectively.

10. The method of claim 9, wherein the message trap engine circuit virtualizes multiple downstream ports of the virtual switch, the virtual switch being a single-layer switch.

11. The method of claim 9, wherein the message trap engine circuit virtualizes multiple downstream ports of the virtual switch, the virtual switch being a multi-layer switch.

12. The method of claim 9, wherein the message trap engine circuit is executed by a processor of the programmable integrated circuit.

13. The method of claim 9 further comprising responding, by the message trap engine circuit, to a source of the received PCIe message when the received PCIe message is the PCIe Type 1 configuration transaction, the message trap engine circuit being capable of responding with an unsupported message response when the received PCIe message targets an unsupported bus number.

14. The method of claim 9, wherein the programmable integrated circuit is a field programmable gate array (FPGA) System-on-Chip (SoC).

15. A device comprising:
   a programmable integrated circuit comprising:
      a classifier circuit capable of receiving a Peripheral Component Interconnect Express (PCIe) message and configured to determine whether the PCIe message is a PCIe Type 1 configuration transaction or is a non-PCIe Type 1 configuration transaction, the classifier circuit further being configured to forward the PCIe message to an endpoint device of one or more endpoint devices in one or more programmable logic regions of the programmable integrated circuit when the PCIe message is the non-PCIe Type 1 configuration transaction;
      a message trap engine circuit, the classifier circuit further being configured to forward the PCIe message to the message trap engine circuit when the PCIe message is the PCIe Type 1 configuration transaction, the message trap engine circuit being configured to virtualize one or more downstream ports of a virtual switch; and
      a respective configuration space of each downstream port of the one or more downstream ports maintained by the message trap engine circuit; and
      a respective configuration space of each endpoint device of the one or more endpoint devices maintained by the message trap engine circuit, the message trap engine circuit being capable of accessing the configuration space of a respective endpoint device or a respective downstream port in response to the PCIe message targeting the respective endpoint device of the one or more endpoint devices or the respective downstream port of the one or more downstream ports, respectively.

16. The device of claim 15, wherein:
   the message trap engine circuit is executed by a processor of the programmable integrated circuit; and
   the classifier circuit is implemented in the one or more programmable logic regions of the programmable integrated circuit.

17. The device of claim 15, wherein the message trap engine circuit virtualizes multiple downstream ports of the virtual switch, the virtual switch being a single-layer switch.

18. The device of claim 15, wherein the message trap engine circuit virtualizes multiple downstream ports of the virtual switch, the virtual switch being a multi-layer switch.

19. The device of claim 15, wherein the programmable integrated circuit further includes a multiplexer circuit in the one or more programmable logic regions, the message trap engine circuit and the one or more endpoint devices being configured to respond to the PCIe message when the PCIe message is received by the message trap engine circuit and the respective endpoint device, respectively, the multiplexer circuit being configured to time multiplex and transmit received responses from the message trap engine circuit and the one or more endpoint devices.

20. The non-transitory memory of claim 1, wherein one or more upstream ports of the virtual switch are virtualized on a first circuit, and the one or more downstream ports are virtualized on a second circuit different from the first circuit.

* * * * *